United States Patent
Li et al.

(10) Patent No.: US 11,494,099 B2
(45) Date of Patent: Nov. 8, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Xiongcheng Li, Beijing (CN); Xinlei Xu, Beijing (CN); Changyu Feng, Beijing (CN); Sihang Xia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/313,170

(22) Filed: May 6, 2021

(65) Prior Publication Data
US 2022/0214822 A1   Jul. 7, 2022

(30) Foreign Application Priority Data
Jan. 6, 2021  (CN) .......................... 202110012115.2

(51) Int. Cl.
*G06F 3/00* (2006.01)
*G06F 3/06* (2006.01)
(Continued)

(52) U.S. Cl.
CPC .......... *G06F 3/0634* (2013.01); *G06F 3/0604* (2013.01); *G06F 3/0689* (2013.01);
(Continued)

(58) Field of Classification Search
CPC ............ G06F 12/0868; G06F 12/0804; G06F 12/0806; G06F 9/46; G06F 11/142;
(Continued)

(56) References Cited

U.S. PATENT DOCUMENTS

| 10,180,790 B1 | 1/2019 | Taylor et al. |
| 11,256,439 B2 | 2/2022 | Shveidel et al. |

(Continued)

*Primary Examiner* — Reginald G Bragdon
*Assistant Examiner* — Michael L Westbrook
(74) *Attorney, Agent, or Firm* — BainwoodHuang (57) ABSTRACT

The present disclosure relates to a method, a device, and a computer program product for managing a storage system. The storage system includes a first control node, a second control node, and a persistent storage device, the first control node being in an activated state, and the second control node being in a state of transfer from a non-activated state to an activated state. A method includes: loading a first list of page descriptors of the storage system to the second control node to generate a second list of page descriptors at the second control node, the first list including a portion of multiple page descriptors of the storage system that has been modified but has not been flushed to the persistent storage device; receiving a synchronization message from the first control node that indicates that the first list has been modified by the first control node; and updating the second list at the second control node based on the synchronization message. Further, a corresponding device and a corresponding program product are provided. With the example implementations of the present disclosure, the start performance of the control nodes in the storage system can be improved.

20 Claims, 7 Drawing Sheets

(51) Int. Cl.
  *G06F 11/16* (2006.01)
  *G06F 11/20* (2006.01)
  *G06F 12/0868* (2016.01)

(52) U.S. Cl.
  CPC ...... *G06F 11/1658* (2013.01); *G06F 11/1662* (2013.01); *G06F 11/2069* (2013.01); *G06F 11/2092* (2013.01); *G06F 12/0868* (2013.01)

(58) Field of Classification Search
  CPC ............ G06F 11/1417; G06F 11/1425; G06F 11/1428; G06F 11/1402; G06F 11/1658; G06F 11/2023; G06F 11/2069; G06F 11/2092; G06F 11/1662; G06F 11/1675; G06F 3/0634; G06F 3/0604; H04L 69/40; H04L 41/0672; H04L 41/0654
  See application file for complete search history.

(56) References Cited

U.S. PATENT DOCUMENTS

| | | | |
|---|---|---|---|
| 11,269,547 B2 | 3/2022 | Liu et al. | |
| 11,327,895 B1 | 5/2022 | Vankamamidi et al. | |
| 11,340,829 B1 | 5/2022 | Shveidel et al. | |
| 2002/0194429 A1* | 12/2002 | Chiu | G06F 12/0866 711/119 |
| 2021/0303594 A1* | 9/2021 | Puvvada | H04L 45/22 |

\* cited by examiner

METHOD, DEVICE, AND COMPUTER PROGRAM PRODUCT FOR MANAGING STORAGE SYSTEM

CROSS-REFERENCE TO RELATED APPLICATION

This application claims priority to Chinese Patent Application No. CN202110012115.2, on file at the China National Intellectual Property Administration (CNIPA), having a filing date of Jan. 6, 2021, and having "METHOD, DEVICE, AND COMPUTER PROGRAM PRODUCT FOR MANAGING STORAGE SYSTEM" as a title, the contents and teachings of which are herein incorporated by reference in their entirety.

TECHNICAL FIELD

Implementations of the present disclosure relate to storage management, and more particularly, to a method, a device, and a computer program product for managing the start of control nodes of a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on Redundant Array of Independent Disks (RAID) have been developed to improve data reliability. In order to improve the parallel access capability of a storage system, technical solutions have been proposed to set multiple control nodes (e.g., a first control node and a second control node) in the storage system. The multiple control nodes can serve read and write requests for the storage system in parallel. In order to improve the performance of the storage system, when data in the storage system is modified, instead of writing the modified data directly to a persistent storage device in the storage system, the modified data is written to a cache device, and then the data in the cache is flushed in the backend to the persistent storage device.

During the operation of the storage system, if one of the control nodes in the storage system fails and is restarted, dirty data in the storage system that has not been flushed to the persistent storage device needs to be read. At this point, how to speed up the restart of the control node has become a technical problem.

SUMMARY OF THE INVENTION

Therefore, it is desirable to develop and implement a technical solution for managing control nodes of a storage system in a more effective manner. It is expected that this technical solution will be compatible with existing storage systems, and by modifying various configurations of existing storage systems, the start of the control nodes can be improved in a more effective manner.

According to a first aspect of the present disclosure, a method for managing a storage system is provided. Here, the storage system includes a first control node, a second control node, and a persistent storage device, the first control node being in an activated state, and the second control node being in a state of transfer from a non-activated state to an activated state. In a method, a first list of page descriptors of the storage system is loaded to the second control node to generate a second list of page descriptors at the second control node, the first list including a portion of multiple page descriptors of the storage system that has been modified but has not been flushed to the persistent storage device. A synchronization message is received from the first control node, the synchronization message indicating that the first list has been modified by the first control node. The second list at the second control node is updated based on the synchronization message.

According to a second aspect of the present disclosure, an electronic device is provided, including: at least one processor; and a memory coupled to the at least one processor, wherein the memory has instructions stored therein that, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings, FIG. 1 schematically illustrates a block diagram of a storage system in which implementations of the present disclosure may be implemented.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or the same objects. Other explicit and implicit definitions may also be included below.

Figure 1:
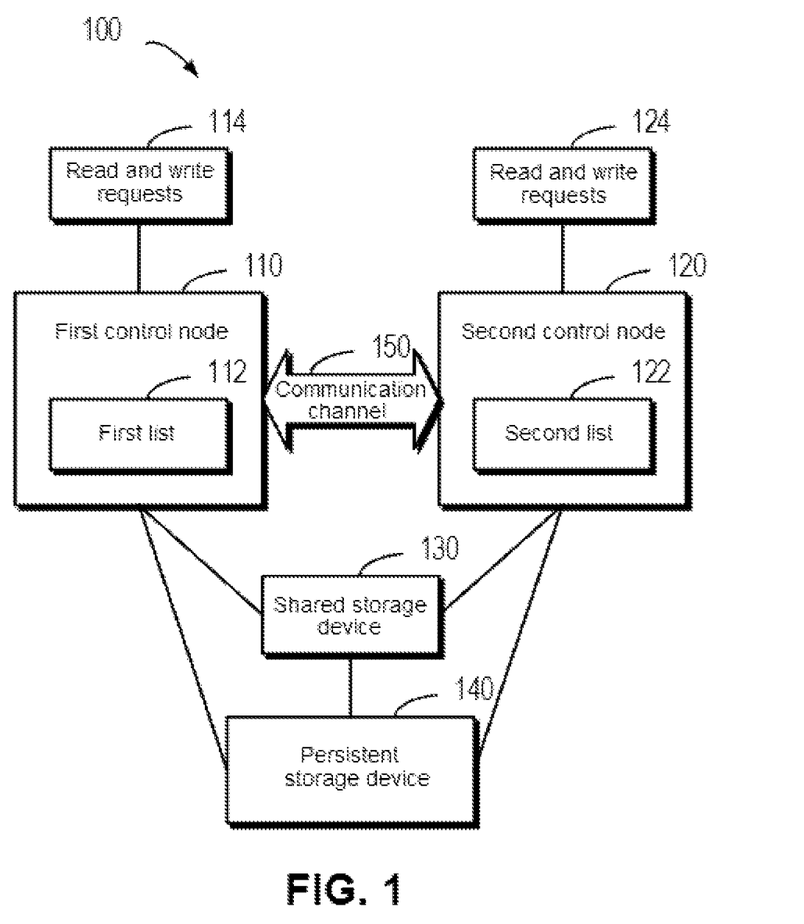

In the context of the present disclosure, example implementations according to the present disclosure will be described by using a RAID storage system as an example of a storage system. It will be understood that the storage system may also be a storage system based on other technologies. Firstly, an application environment according to an example implementation of the present disclosure will be described with reference to FIG. 1. FIG. 1 schematically illustrates a block diagram of storage system 100 in which implementations of the present disclosure may be implemented. As shown in FIG. 1, storage system 100 may include first control node 110, second control node 120, and persistent storage device 140. First control node 110 and second control node 120 have similar functions. Hereinafter, only first control node 110 will be used as an example to describe its functions.

First control node 110 can receive read and write requests 114 from a user of storage system 100. Upon receiving a read request from a user device, first control node 110 can retrieve, from persistent storage device 140 (or other cache device), target data to be read and return the retrieved target data to the user device. Upon receiving a write request, in order to improve the response speed of the storage system, first control node 110 first writes, to the cache device (e.g., shared storage device 130 in FIG. 1), data to be written and returns a "successfully written" response to the user device.

At this point, the data in shared storage device 130 is "dirty data," which means that this data has been modified but has not been flushed to persistent storage device 140. Inside storage system 100, the dirty data in shared storage device 130 can be managed in a backend manner. As storage system 100 operates, the dirty data in shared storage device 130 may continue to grow. The dirty data can be flushed to persistent storage device 140 at predetermined time intervals (or according to other triggering conditions). In order to speed up data access, first list 112 related to the dirty data in shared storage device 130 can be maintained at first control node 110 (e.g., in the memory of first control node 110).

The operation of second control node 120 is also similar in that second control node 120 can serve read and write requests 124 from the user device, can store the dirty data generated by read and write requests 124 in shared storage device 130, and maintain second list 122 in its own memory. First control node 110 and second control node 120 can process user requests independently and may write dirty data to shared storage device 130 separately. At this point, each control node can synchronize the dirty data it generates to the other control node via communication channel 150 to ensure data consistency at both control nodes.

During the operation of the storage system, if one of the control nodes in the storage system fails and is restarted, dirty data in the storage system that has not been flushed to the persistent storage device needs to be read. Technical solutions have been proposed for managing the start of control nodes. In a technical solution, in order to avoid the potential risk of data inconsistency, the operation of a normal control node in an activated state needs to be stopped (that is, this control node is prohibited from processing read and write requests) during the start of a failed control node. At this point, the failed control node can load dirty data from the normal control node. After the loading has been completed, the operation of this normal control node is resumed (that is, this control node is allowed to process read and write requests). However, depending on the amount of data in a list, the loading process may take a long time. This will cause the storage system to be unable to process read and write requests from the user device for a long time.

In order to address the above defects in existing technical solutions, according to an example implementation of the present disclosure, a method for managing a storage system is proposed. With this method, it is not necessary to stop the normal service of a control node in an activated state, but rather it is possible to start a failed control node while the control node in an activated state is normally processing read and write requests. Hereinafter, an overview of an example implementation according to the present disclosure will be described with reference to FIG. 2.

Figure 2:
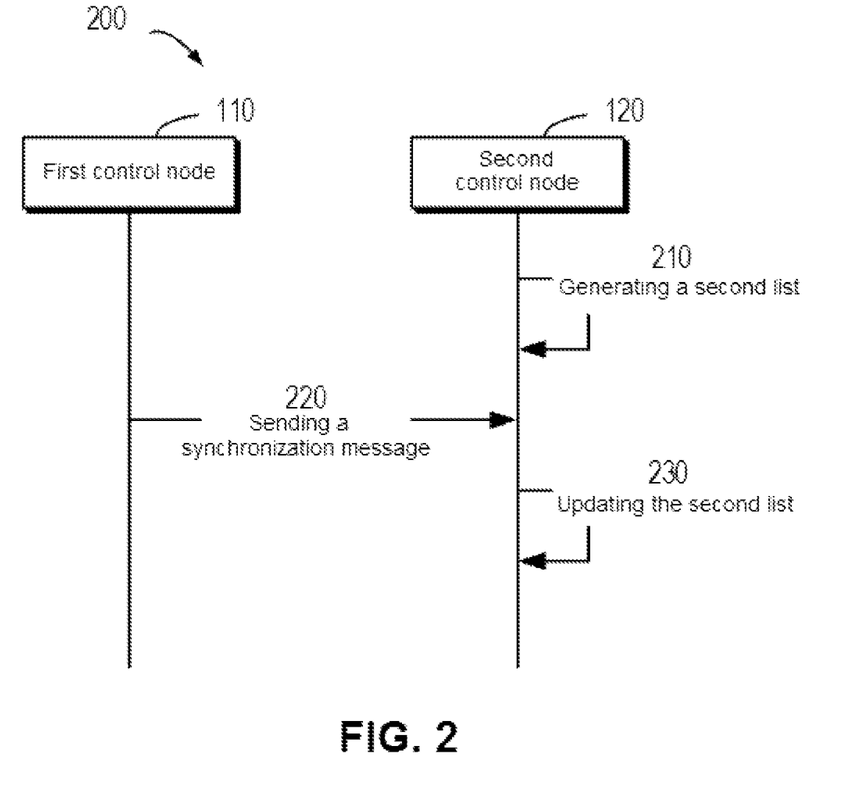
FIG. 2 schematically illustrates a block diagram of a process for managing a storage system according to an implementation of the present disclosure.

FIG. 2 schematically illustrates a block diagram of process 200 for managing a storage system according to an implementation of the present disclosure. Assume that first control node 110 is in a normal activated state and second control node 120 fails and is restarted. At this point, second control node 120 needs to acquire dirty data in the storage system. As shown in FIG. 2, second control node 120 can load dirty data (e.g., from first control node 110 or from shared storage device 130) to generate second list 122 at second control node 120.

According to an example implementation of the present disclosure, it is not necessary to stop the operation of first control node 110, but rather first control node 110 can continue to process data read and write requests from a user device. If a certain write request needs to change data in the storage system, first list 112 at first control node 110 will change, at which point first control node 110 can send 220 a synchronization message to second control node 120 to inform second control node 120 of this change. Second control node 120 can receive the synchronization message and update 230 second list 122 based on that synchronization message.

With the example implementation of the present disclosure, second control node 120 can be started without interrupting the storage service of first control node 110. With the example implementation of the present disclosure, first control node 110 can continuously provide normal storage services before second control node 120 is successfully started. After second control node 120 is successfully started, both first control node 110 and second control node 120 can provide normal data services. In this manner, the interruption time of storage system 100 can be reduced, which in turn improves the response speed to read and write requests from the user device.

Figure 3:
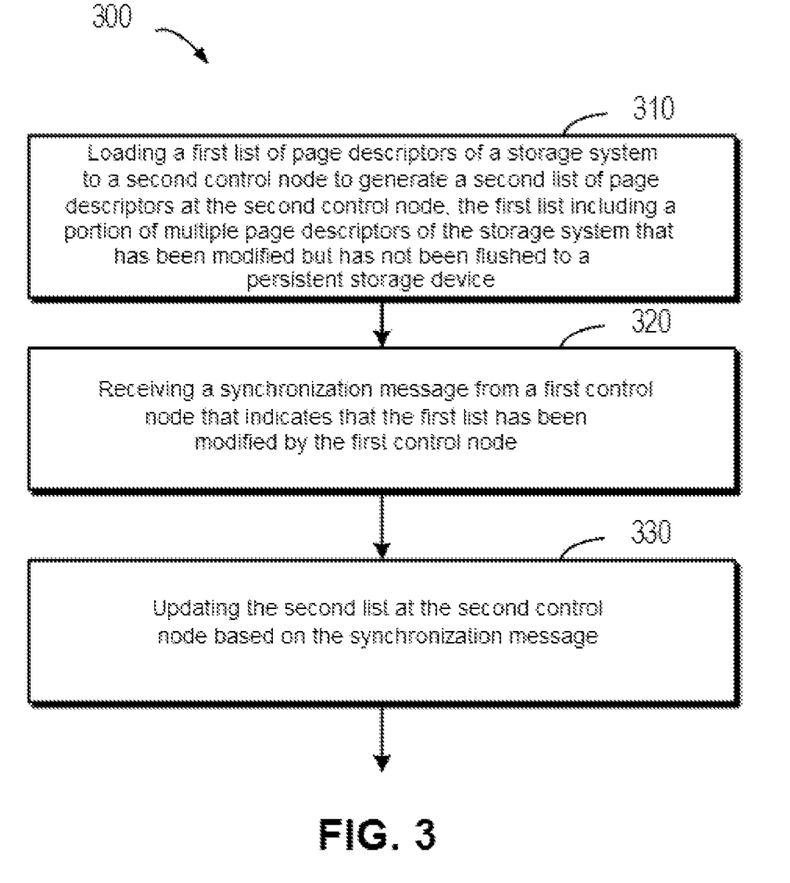
FIG. 3 schematically illustrates a block diagram of a method for managing a storage system according to an implementation of the present disclosure.

Hereinafter, more details of an example implementation according to the present disclosure will be described with reference to FIG. 3. FIG. 3 schematically illustrates a block diagram of method 300 for managing a storage system according to an implementation of the present disclosure. Storage system 100 includes first control node 110, second control node 120, and persistent storage device 140. Here, first control node 110 is in an activated state and second control node 120 is in a state of transfer from a non-activated state to an activated state. According to an example implementation of the present disclosure, dirty data may involve page descriptors in the storage system. Here, the page descriptors can represent indexes related to data (e.g., metadata and user data) in the storage system. Specifically, the page descriptors may include at least any one of a metadata page descriptor and a user data page descriptor of the storage system.

As shown in FIG. 3, at block 310, first list 112 of page descriptors of storage system 100 is loaded to second control node 120 to generate second list 122 of page descriptors at second control node 120. Here, first list 112 includes a portion of multiple page descriptors of storage system 100 that has been modified but has not been flushed to the persistent storage device (i.e., "dirty" page descriptors). According to an example implementation of the present disclosure, first list 112 can be loaded from multiple positions in the storage system. For example, first list 112 can be loaded from first control node 110 or shared storage device 130 of the storage system.

According to an example implementation of the present disclosure, an available bandwidth between first control node 110 and second control node 120 can be determined first. If the available bandwidth between first control node 110 and second control node 120 is above a predetermined threshold, first list 112 is loaded from first control node 110 to generate second list 122. Here, the predetermined threshold can be determined based on the maximum time that can be withstood for loading first list 112 from first control node 110. For example, this predetermined threshold can be set to 0.1 seconds (or another time interval). Second control node 120 can read first list 112 from first control node 110 via communication channel 150. After first list 112 is read by second control node 120, second list 122 can be generated in the memory of second control node 120.

According to an example implementation of the present disclosure, the page descriptors in first list 112 can be stored in a chronological order in which they were added to that list. Specifically, first list 112 may include two ends (e.g., a head and a tail). When the read and write requests processed by first control node 110 generate a dirty page descriptor in the storage system, the generated dirty page descriptor can be added to the first of the two ends (e.g., the head). Each time when a dirty page descriptor is generated, the dirty page descriptor can be added to the head of first list 112. At this point, the head of first list 112 will move forward by one unit.

According to an example implementation of the present disclosure, data can be flushed from the second end (e.g., the tail) of first list 112 in the order in which the page descriptors are added to first list 112. Specifically, the page descriptor located at the tail can be flushed into persistent storage device 140 of storage system 100 each time. At this point, the tail of first list 112 will move forward by one unit and the dirty page descriptor that has been flushed will no longer be included in first list 112.

According to an example implementation of the present disclosure, when loading first list 112 from first control node 110, the two ends of the first list can be determined first. It will be understood that the page descriptors located between the two ends are dirty page descriptors that have not been flushed, and thus the page descriptors between the two ends can be loaded from first control node 110 to second control node 120.

According to an example implementation of the present disclosure, if the available bandwidth between first control node 110 and second control node 120 is below a predetermined threshold, loading first list 112 from first control node 110 in this case will cause excessive time delay. Therefore, the dirty page descriptors that have not been flushed can be loaded from a cache device (e.g., shared storage device 130) of storage system 100 to generate second list 122 in second control node 120.

The process of generating second list 122 has been described above, and hereinafter, more processing processes regarding the synchronization message from first control node 110 will be described by still referring to FIG. 3. At block 320, a synchronization message from first control node 110 is received, which indicates that the first list has been modified by the first control node. It will be understood that first control node 110 is always in the activated state and thus first control node 110 can receive read and write requests from the user device. Upon receiving a read request, first control node 110 can return, to the user device, target data expected to be read. When a request for writing data to storage system 100 is received, first control node 110 can update the corresponding page descriptor based on the write request. Further, flushing dirty page descriptors to persistent storage system 140 can be handled in the backend inside storage system 100. Specifically, first control node 110 can modify the head or tail of first list 112 in the manner described above.

At block 330, second list 122 at second control node 120 is updated based on the synchronization message. According to an example implementation of the present disclosure, the synchronization message may include two types: 1) a new page descriptor is added to first list 112; and 2) an existing page descriptor in first list 112 is removed. Therefore, second list 122 can be updated based on the above two types, respectively.

Figure 4A:
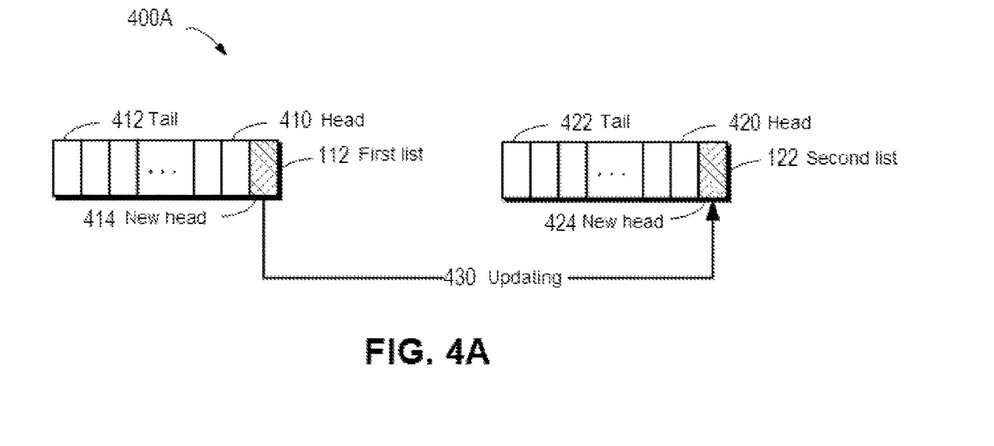
FIG. 4A schematically illustrates a block diagram of a process for handling a situation where a page descriptor in a storage system is modified according to an implementation of the present disclosure.

Hereinafter, more details related to modification of the first type will be described with reference to FIG. 4. Specifically, FIG. 4A schematically illustrates a block diagram of process 400A for handling a situation where a page descriptor in a storage system is modified according to an implementation of the present disclosure. As shown in FIG. 4A, prior to an inserting process, first list 112 includes a portion between head 410 and tail 412, and second list 122 includes a portion between head 420 and tail 422.

During the processing of a write request by first control node 110, the write request may modify a certain target page descriptor. At this point, first control node 110 can add this target page descriptor to head 410 of first list 112. At this point, the position of the head will move forward by one unit and reach the position of new head 414. First control node 110 can send a synchronization message to second control node 120 to indicate this adding process. At second control node 120, if it is determined that the updated message indicates that a target page descriptor among multiple page descriptors of the storage system is added to first list 112, the target page descriptor can be added to second list 122.

It will be understood that the structure of second list 122 here can be similar to that of first list 112. In other words, the recently modified dirty page descriptor can be inserted into the head of second list 122. At this point, when second control node 120 receives the synchronization message indicating the adding process, it can add the target page descriptor to the head of second list 122. Specifically, as shown by arrow 430, the head of second control node 120 can be updated from head 420 to new head 424. With the example implementation of the present disclosure, the content of updated second list 122 will be the same as the content of first list 112 at first control node 110. That is, the two lists are synchronized, thus avoiding the situation of data inconsistency caused by accessing the storage system from the two control nodes.

Figure 4B:
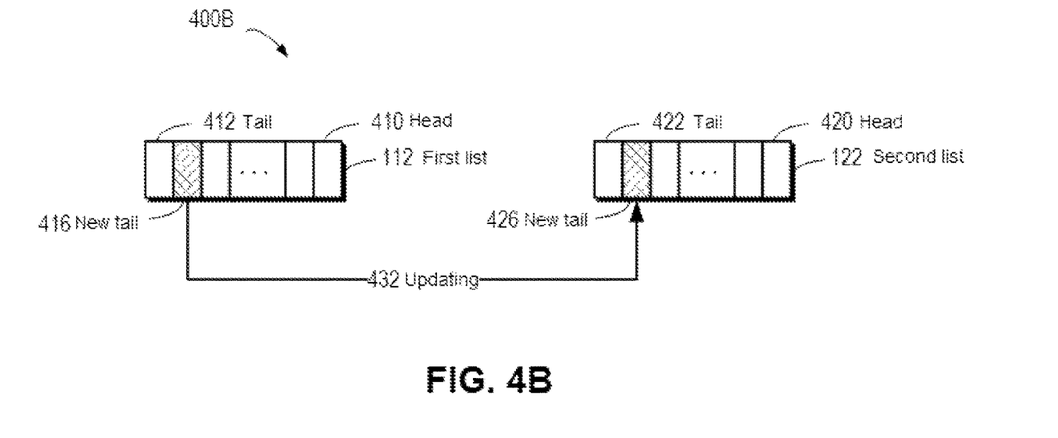
FIG. 4B schematically illustrates a block diagram of a process for handling a situation where a modified page descriptor is flushed to a persistent storage device according to an implementation of the present disclosure.

According to an example implementation of the present disclosure, during the operation of first control node 110, the dirty page descriptors are managed in the backend in storage system 100. For example, part or all of the dirty page descriptors in first list 112 can be flushed to persistent storage device 140 at predetermined time intervals and/or when the number of dirty page descriptors in first list 112 reaches a predetermined threshold. FIG. 4B schematically illustrates a block diagram of process 400B for handling a situation where a modified page descriptor is flushed to a persistent storage device according to an implementation of the present disclosure. Prior to the flushing process, first list 112 includes a portion between head 410 and tail 412, and second list 122 includes a portion between head 420 and tail 422.

Assume that the page descriptor at tail 412 of first list 112 has been flushed to persistent storage device 140, tail 412 of first list 112 will move forward by one unit to reach new tail 416. At this point, data at old tail 412 is no longer valid, and first control node 110 can send synchronization data indicating the flushing process to second control node 120.

After receiving the synchronization data indicating the flushing process, second control node 120 can remove the target page descriptor indicated by a synchronization request from second list 122. Specifically, this target page descriptor can be removed from the tail of second list 122. It will be understood that the target page descriptor here refers to data that has been flushed to the persistent storage system, and thus at second control node 120, only the tail of second list 122 needs to move forward by one unit. Specifically, as shown by arrow 432 in FIG. 4B, the tail of second list 122 can move from old tail 422 to new tail 426. At this point, the data at old tail 422 is no longer valid. With the example implementation of the present disclosure, the data consistency between first list 112 and second list 122 can be ensured, and thus the data consistency of storage system 100 can be ensured.

Figure 5A:
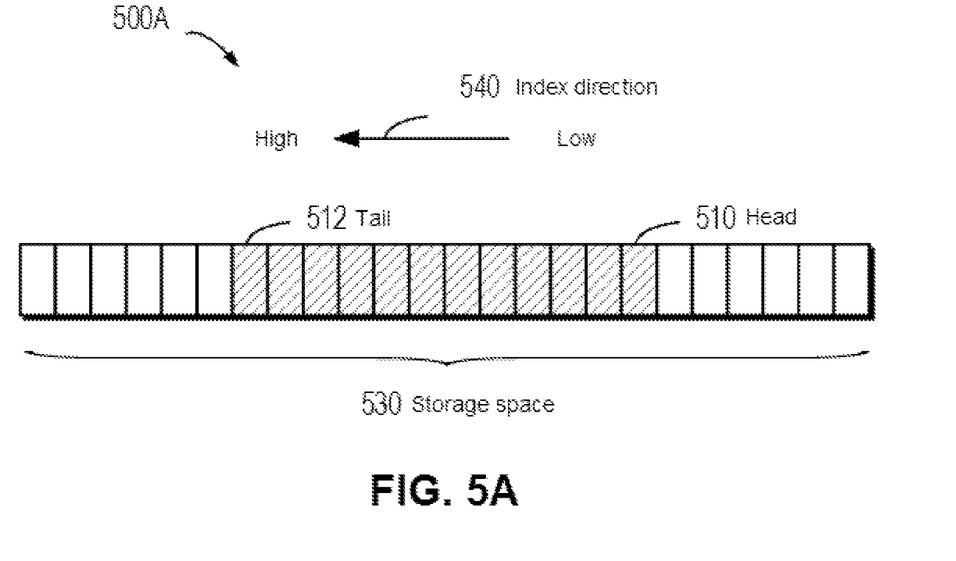
FIGS. 5A and 5B each schematically illustrate a block diagram of a ring list for storing page descriptors according to an implementation of the present disclosure.

The structures of first list 112 and second list 122 have been described with reference to FIGS. 4A and 4B. According to an example implementation of the present disclosure, first list 112 and second list 122 can be implemented based on a ring list. Hereinafter, more details about the ring list will be described with reference to FIGS. 5A and 5B. FIG. 5A schematically illustrates a block diagram of ring list 500A for storing page descriptors according to an implementation of the present disclosure. As shown in FIG. 5A, a contiguous section of storage space 530 can be used to store the ring list. Storage space 530 may include a predetermined number (e.g., 1024 or another number) of storage units, each of which may be represented by a unique index.

For example, the rightmost storage unit of storage space 530 may be represented as index 0 and the leftmost storage unit may be represented as index 1023, as shown in index direction 540 in FIG. 5A. Each storage unit can store one page descriptor. The shaded portions in FIG. 5 represent the ring list portions. In other words, the dirty page descriptors in the ring list are located between head 510 and tail 512.

Figure 5B:
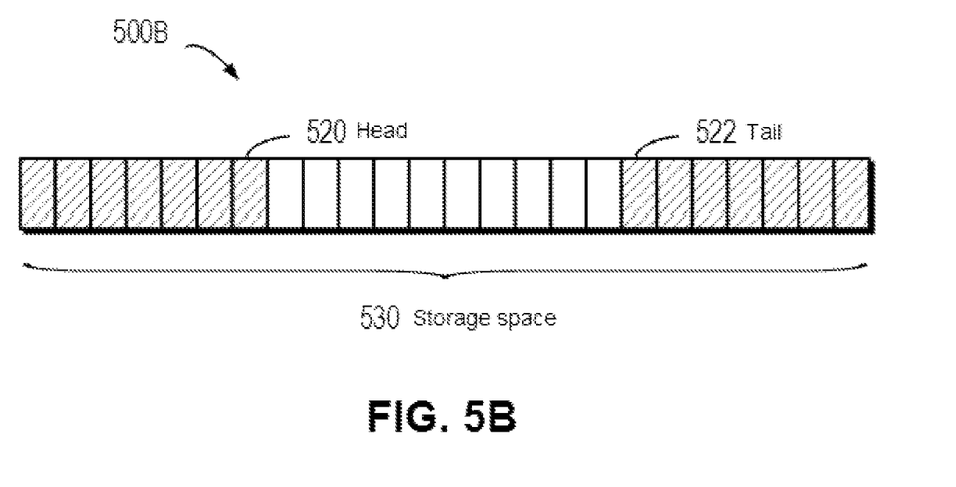

According to an example implementation of the present disclosure, dirty page descriptors can be continually added to head 510 of the ring list, and data at tail 520 of the ring list can be continually flushed to persistent storage device 140. At this point, the position of the ring list will change and the index of the tail may be smaller than that of the head. FIG. 5B schematically illustrates a block diagram of ring list 500B for storing page descriptors according to an implementation of the present disclosure. In FIG. 5B, the shaded area illustrates the range where the ring list is located, and the index of tail 522 is smaller than that of head 520. At this point, the range where the ring list is located can be redetermined based on the "modulo" operation. As shown in FIG. 5B, the ring list includes storage units between head 520 and index 1023 and includes storage units between index 0 and tail 522.

Figure 6:
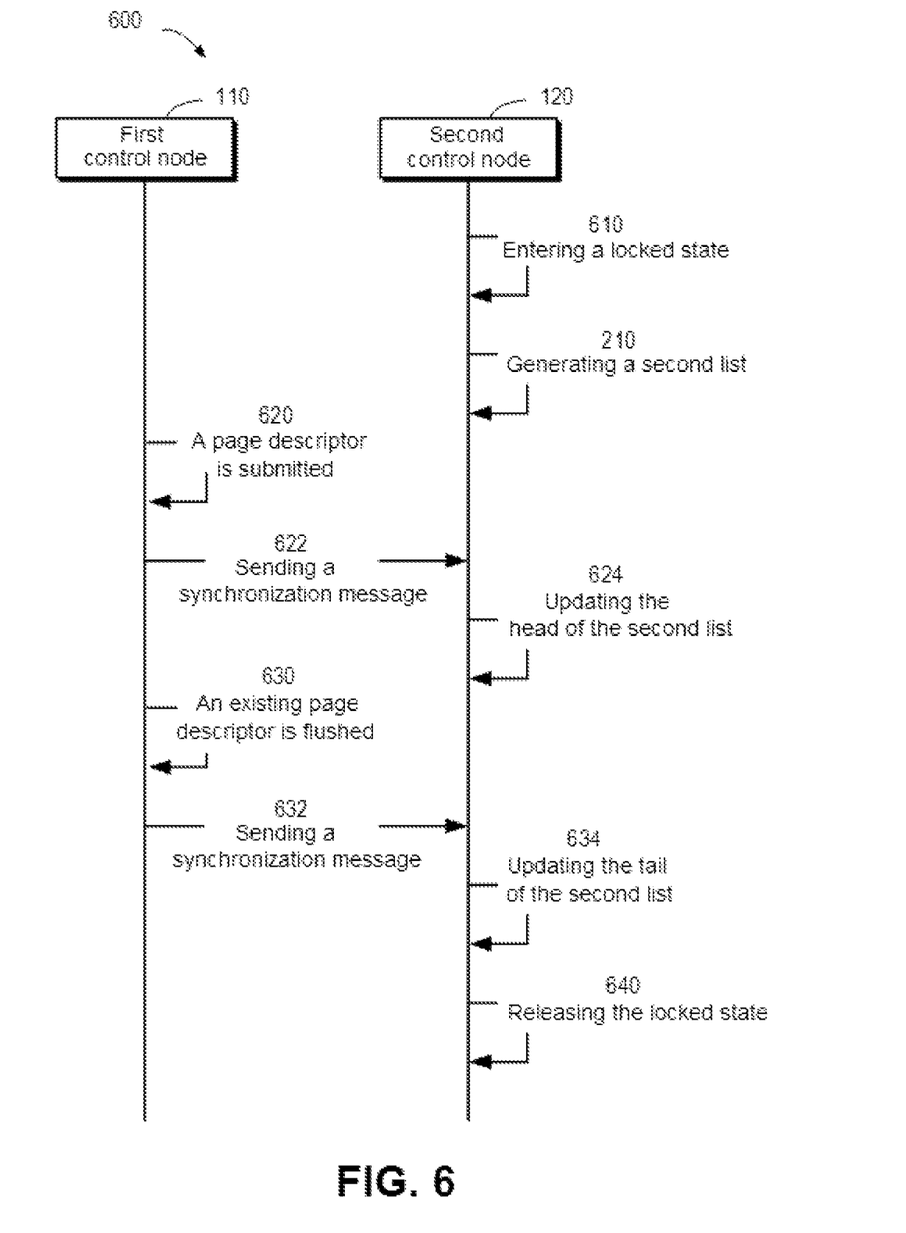
FIG. 6 schematically illustrates a block diagram of a process for managing a storage system according to an implementation of the present disclosure.

According to an example implementation of the present disclosure, during the operation of storage system 100, second list 122 can be updated in accordance with the method described above. If it is determined that the second list has been updated, it means that first list 112 and second list 122 have been synchronized, at which point second control node 122 can be set to the activated state. Main steps of method 300 performed during the start of second control node 120 have been described above. Hereinafter, optional steps such as locking and unlocking will be described with reference to FIG. 6. FIG. 6 schematically illustrates a block diagram of process 600 for managing a storage system according to an implementation of the present disclosure. As shown in FIG. 6, second control node 120 can enter 610 a locked state when second control node 120 is being started. In the locked state, second control node 120 remains in the start process and cannot serve read and write requests from external user devices.

Second control node 120 can generate 210 second list 122. For example, it can load page descriptors from first control node 110 and/or shared storage device 130 so as to generate second list 122. At this point, first control node 110 can operate normally and serve read and write requests from external user devices. If the read and write requests modify a page descriptor in the storage system, the modified page descriptor will be submitted 620 to first list 112. At this point, first control node 110 can send 622 a synchronization message to second control node 120. Upon receiving the synchronization message, second control node 120 can update the head of second list 122 (i.e., insert the modified page descriptor into the head position) according to the synchronization message.

Inside the storage system, first list 112 can be managed in the backend. A certain (some) page descriptor(s) in first list 112 can be flushed 630 to persistent storage device 140 of storage system 100 when a predetermined condition is satisfied. At this point, first control node 110 can send 632 a synchronization message to second control node 120. Upon receiving the synchronization message, second control node 120 can update the tail of second list 122. After second list 122 in second control node 120 has been successfully updated, second control node 120 can be unlocked 640. It will be understood that during the above process, first control node 110 does not stop working, but can continuously serve the external user devices. In this way, storage system 100 is not interrupted in its overall operation even though second control node 120 inside storage system 100 is in the start process and cannot serve user devices. In this way, storage system 100 can continuously serve the external user devices.

According to an example implementation of the present disclosure, after the process as shown in FIG. 6 has been successfully performed, an index can also be created for each page descriptor in second list 122 in order to improve the response speed of this second control node 120. In order to prevent the problem of data inconsistency in storage system 100, second list 122 can be locked first, and the page descriptors between the head and tail of that list can be traversed in order to create indexes. After the indexes are successfully created, the locking can be released and first control node 110 can be notified that second control node 120 has been successfully started and has entered the activated state. At this point, both control nodes have entered the normal working state and can serve read and write requests from user devices in parallel.

Examples of the method according to the present disclosure have been described in detail above with reference to FIGS. 2 to 6, and implementations of a corresponding apparatus will be described below. According to an example implementation of the present disclosure, an apparatus for managing a storage system is provided. The storage system includes a first control node, a second control node, and a persistent storage device, the first control node being in an activated state, and the second control node being in a state of transfer from a non-activated state to an activated state. The apparatus includes: a generating module configured to load a first list of page descriptors of the storage system to the second control node to generate a second list of page descriptors at the second control node, the first list including a portion of multiple page descriptors of the storage system that has been modified but has not been flushed to the persistent storage device; a receiving module configured to receive a synchronization message from the first control node that indicates that the first list has been modified by the first control node; and an updating module configured to update the second list at the second control node based on the synchronization message. According to an example implementation of the present disclosure, this apparatus further includes modules for performing other steps in method 300 described above.

Figure 7:
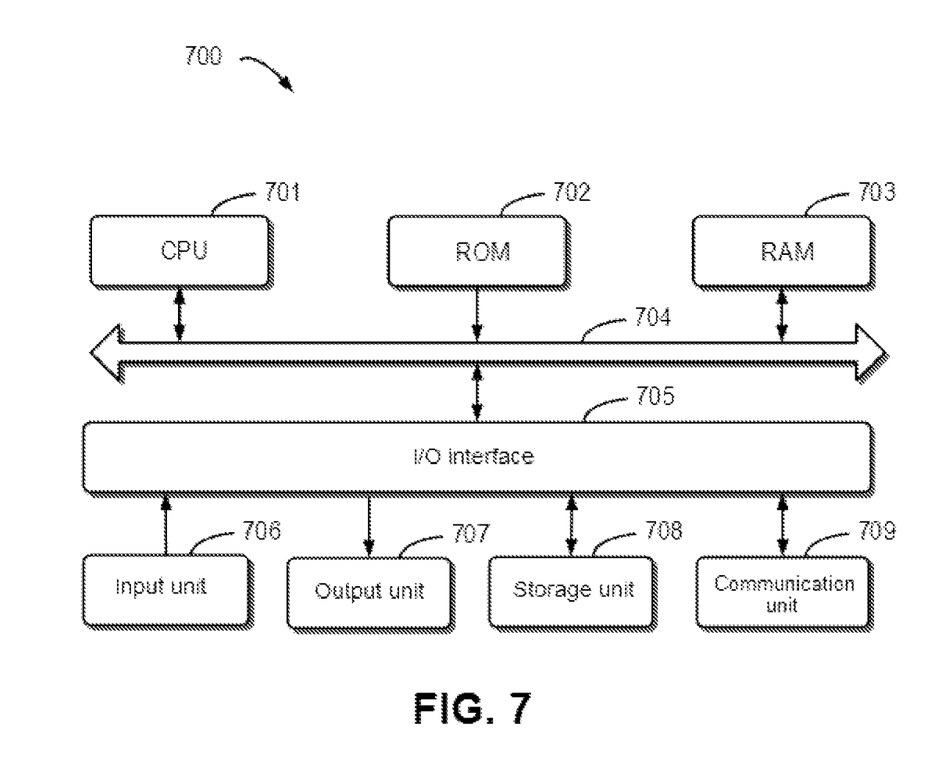
FIG. 7 schematically illustrates a block diagram of a device for managing a storage system according to an example implementation of the present disclosure.

FIG. 7 schematically illustrates a block diagram of device 700 for managing a storage system according to an example implementation of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 into random access memory (RAM) 703. Various programs and data required for operations of device 700 may also be stored in RAM 703. CPU 701, ROM 702, and RAM 703 are connected to each other through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 300, may be performed by processing unit 701. For example, in some implementations, method 300 may be implemented as a computer software program that is tangibly included in a machine-readable medium, such as storage unit 708. In some implementations, part or all of the computer program may be loaded and/or installed onto device 700 via ROM 702 and/or communication unit 709. One or more steps of method 300 described above may be performed when the computer program is loaded into RAM 703 and executed by CPU 701. Alternatively, in other implementations, CPU 701 may also be configured in any other suitable manner to implement the above processes/methods.

According to an example implementation of the present disclosure, an electronic device is provided. The electronic device includes: at least one processor; and a memory coupled to the at least one processor, wherein the memory has instructions stored therein which, when executed by the at least one processor, cause the device to perform actions for managing a storage system. The storage system includes a first control node, a second control node, and a persistent storage device, the first control node being in an activated state, and the second control node being in a state of transfer from a non-activated state to an activated state. The actions include: loading a first list of page descriptors of the storage system to the second control node to generate a second list of page descriptors at the second control node, the first list including a portion of multiple page descriptors of the storage system that has been modified but has not been flushed to the persistent storage device; receiving a synchronization message from the first control node that indicates that the first list has been modified by the first control node; and updating the second list at the second control node based on the synchronization message.

According to an example implementation of the present disclosure, updating the second list includes: in response to determining that the update message indicates that a target page descriptor among the multiple page descriptors of the storage system is added to the first list, adding the target page descriptor to the second list.

According to an example implementation of the present disclosure, the page descriptors in the second list are arranged in a chronological order, and adding the target page descriptor to the second list includes: adding the target page descriptor to a first end of the second list.

According to an example implementation of the present disclosure, updating the second list based on the synchronization message includes: in response to determining that the update message indicates that the target page descriptor in the first list is flushed to the persistent storage system, removing the target page descriptor from the second list.

According to an example implementation of the present disclosure, the page descriptors in the second list are arranged in a chronological order, and removing the target page descriptor from the second list includes: removing the target page descriptor from a second end of the second list.

According to an example implementation of the present disclosure, generating the second list includes at least any one of the following: in response to determining that an available bandwidth between the first control node and the second control node is above a predetermined threshold, loading the first list from the first control node to generate the second list; and in response to determining that the available bandwidth between the first control node and the second control node is below the predetermined threshold, loading the first list from a cache device in the storage system for caching the multiple page descriptors to generate the second list.

According to an example implementation of the present disclosure, loading the first list from the first control node includes: determining two ends of the first list; and loading page descriptors between the two ends from the first control node to the second control node.

According to an example implementation of the present disclosure, the actions further include: in response to determining that the second list has been updated, setting the second control node to an activated state.

According to an example implementation of the present disclosure, the page descriptors include at least any one of a metadata page descriptor and a user data page descriptor of the storage system, and the actions further include: locking the second control node before loading the first list to the second control node; and unlocking the second control node in response to determining that the second list has been updated.

According to an example implementation of the present disclosure, the actions are performed at the second control node, and the actions further include: in response to determining that the second list has been updated, creating an index for each page descriptor in the second list.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example embodiment of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing a storage system that includes a first control node, a second control node, and a persistent storage device, the first control node being in an activated state, and the second control node being in a state of transfer from a non-activated state to the activated state, the method comprising:

loading a first list of page descriptors of the storage system to the second control node to generate a second list of page descriptors at the second control node, the first list including a portion of multiple page descriptors of the storage system that has been modified but has not been flushed to the persistent storage device;

receiving a synchronization message from the first control node that indicates that the first list has been modified by the first control node; and updating the second list at the second control node based on the synchronization message;

wherein generating the second list includes at least any one of the following:

in response to determining that an available bandwidth between the first control node and the second control node is above a predetermined threshold, loading the first list from the first control node to generate the second list; and in response to determining that the available bandwidth between the first control node and the second control node is below the predetermined threshold, loading the first list from a cache device in the storage system for caching the multiple page descriptors to generate the second list.

2. The method according to claim 1, wherein updating the second list includes: in response to determining that the update message indicates that a target page descriptor among the multiple page descriptors of the storage system is added to the first list, adding the target page descriptor to the second list.

3. The method according to claim 2, wherein the page descriptors in the second list are arranged in a chronological order, and adding the target page descriptor to the second list includes: adding the target page descriptor to a first end of the second list.

4. The method according to claim 1, wherein updating the second list based on the synchronization message includes: in response to determining that the update message indicates that a target page descriptor in the first list is flushed to the persistent storage system, removing the target page descriptor from the second list.

5. The method according to claim 4, wherein the page descriptors in the second list are arranged in a chronological order, and removing the target page descriptor from the second list includes: removing the target page descriptor from a second end of the second list.

6. The method according to claim 1, wherein loading the first list from the first control node includes:

determining two ends of the first list; and loading page descriptors between the two ends from the first control node to the second control node.

7. The method according to claim 1, wherein the page descriptors include at least any one of a metadata page descriptor and a user data page descriptor of the storage system, and the method further includes:

locking the second control node before loading the first list to the second control node; and unlocking the second control node in response to determining that the second list has been updated.

8. The method according to claim 1, further including: in response to determining that the second list has been updated, setting the second control node to an activated state.

9. The method according to claim 1, wherein the method is performed at the second control node, and the method further includes: in response to determining that the second list has been updated, creating an index for each page descriptor in the second list.

10. The method according to claim 1, further including:
serving, from the first control node and the second control node in parallel, write requests that write data to the persistent storage device and read requests that read data from the persistent storage device.

11. An electronic device, comprising:
at least one processor; and
a memory coupled to the at least one processor, wherein the memory has instructions stored therein that, when executed by the at least one processor, cause the device to perform actions for managing a storage system that includes a first control node, a second control node, and a persistent storage device, the first control node being in an activated state, and the second control node being in a state of transfer from a non-activated state to the activated state, wherein the actions include:
loading a first list of page descriptors of the storage system to the second control node to generate a second list of page descriptors at the second control node, the first list including a portion of multiple page descriptors of the storage system that has been modified but has not been flushed to the persistent storage device;
receiving a synchronization message from the first control node that indicates that the first list has been modified by the first control node; and
updating the second list at the second control node based on the synchronization message;
wherein generating the second list includes at least any one of the following:
in response to determining that an available bandwidth between the first control node and the second control node is above a predetermined threshold, loading the first list from the first control node to generate the second list; and
in response to determining that the available bandwidth between the first control node and the second control node is below the predetermined threshold, loading the first list from a cache device in the storage system for caching the multiple page descriptors to generate the second list.

12. The device according to claim 11, wherein updating the second list includes: in response to determining that the update message indicates that a target page descriptor among the multiple page descriptors of the storage system is added to the first list, adding the target page descriptor to the second list.

13. The device according to claim 12, wherein the page descriptors in the second list are arranged in a chronological order, and adding the target page descriptor to the second list includes: adding the target page descriptor to a first end of the second list.

14. The device according to claim 11, wherein updating the second list based on the synchronization message includes: in response to determining that the update message indicates that a target page descriptor in the first list is flushed to the persistent storage system, removing the target page descriptor from the second list.

15. The device according to claim 14, wherein the page descriptors in the second list are arranged in a chronological order, and removing the target page descriptor from the second list includes: removing the target page descriptor from a second end of the second list.

16. The device according to claim 11, wherein loading the first list from the first control node includes:
determining two ends of the first list; and
loading page descriptors between the two ends from the first control node to the second control node.

17. The device according to claim 11, wherein the page descriptors include at least any one of a metadata page descriptor and a user data page descriptor of the storage system, and the actions further include:
locking the second control node before loading the first list to the second control node; and
unlocking the second control node in response to determining that the second list has been updated.

18. The device according to claim 11, wherein the actions are performed at the second control node, and the actions further include at least any one of the following:
in response to determining that the second list has been updated, setting the second control node to an activated state; and
in response to determining that the second list has been updated, creating an index for each page descriptor in the second list.

19. The device according to claim 11, wherein the actions further include:
serving, from the first control node and the second control node in parallel, write requests that write data to the persistent storage device and read requests that read data from the persistent storage device.

20. A computer program product having a non-transitory computer readable medium which stores a set of instructions to manage a storage system that includes a first control node, a second control node, and a persistent storage device, the first control node being in an activated state, and the second control node being in a state of transfer from a non-activated state to the activated state; the set of instructions, when carried out by computerized circuitry, causing the computerized circuitry to perform a method of:
loading a first list of page descriptors of the storage system to the second control node to generate a second list of page descriptors at the second control node, the first list including a portion of multiple page descriptors of the storage system that has been modified but has not been flushed to the persistent storage device;
receiving a synchronization message from the first control node that indicates that the first list has been modified by the first control node; and
updating the second list at the second control node based on the synchronization message;
wherein generating the second list includes at least any one of the following:
in response to determining that an available bandwidth between the first control node and the second control node is above a predetermined threshold, loading the first list from the first control node to generate the second list; and
in response to determining that the available bandwidth between the first control node and the second control node is below the predetermined threshold, loading the first list from a cache device in the storage system for caching the multiple page descriptors to generate the second list.

* * * * *